United States Patent
Zunke

(10) Patent No.: US 7,191,325 B2
(45) Date of Patent: Mar. 13, 2007

(54) METHOD OF OPERATING A COMPUTER SYSTEM AND A COMPUTER SYSTEM INCLUDING A PREDETERMINED RUN AUTHORIZATION

(75) Inventor: Michael Zunke, Aschheim (DE)

(73) Assignee: Aladdin Knowledge Systems (Deutschland) GmbH, Germering (DE)

( * ) Notice: Subject to any disclaimer, the term of this patent is extended or adjusted under 35 U.S.C. 154(b) by 498 days.

(21) Appl. No.: 10/632,221

(22) Filed: Jul. 31, 2003

(65) Prior Publication Data

US 2004/0025049 A1 Feb. 5, 2004

(30) Foreign Application Priority Data

Aug. 2, 2002 (EP) ................................ 02017381

(51) Int. Cl.
*G06F 9/00* (2006.01)
*H04N 7/16* (2006.01)
(52) U.S. Cl. ................. 713/1; 726/26; 726/27; 726/33
(58) Field of Classification Search ............ None
See application file for complete search history.

(56) References Cited

U.S. PATENT DOCUMENTS

| | | | |
|---|---|---|---|
| 5,014,234 A * | 5/1991 | Edwards, Jr. | 726/33 |
| 5,442,645 A * | 8/1995 | Ugon et al. | 714/736 |
| 5,848,154 A | 12/1998 | Nishio et al. | |
| 6,226,749 B1 | 5/2001 | Carloganu et al. | |
| 6,587,881 B1 * | 7/2003 | Agarwal et al. | 709/225 |
| 2002/0107750 A1 * | 8/2002 | Kanevsky et al. | 705/26 |

FOREIGN PATENT DOCUMENTS

WO     WO 00/60434     10/2000

OTHER PUBLICATIONS

European Search Report, Jan. 2, 2003.

\* cited by examiner

*Primary Examiner*—A. Elamin
*Assistant Examiner*—Anand B. Patel
(74) *Attorney, Agent, or Firm*—Patterson, Thuente, Skaar & Christensen, P.A.

(57) ABSTRACT

A method of operating a computer system on which an application is installed comprises the steps of:
  verifying whether a predetermined run authorization for the application is present, and,
  in the absence of said predetermined run authorization, decreasing the speed of execution of the application on the computer system as compared to the speed of execution of the application in the presence of the predetermined run authorization.

19 Claims, 2 Drawing Sheets

METHOD OF OPERATING A COMPUTER SYSTEM AND A COMPUTER SYSTEM INCLUDING A PREDETERMINED RUN AUTHORIZATION

FIELD OF THE INVENTION

The invention relates to a method of operating a computer system, to a computer system and to a computer program product.

BACKGROUND OF THE INVENTION

A method of operating a computer system on which an application is installed, is often used to verify the run authorization (license) of the application. If said run authorization has expired, the application is terminated, for example, and renewed calling of the application is prevented. However, this manner of terminating the application is not very user-friendly, because it does not allow, for example, saving the work result (e.g., by storage).

On the other hand, upon expiration of the run authorization, only a new start of the application can be prevented. In this case, the user may continue execution of the program and thus also continue to use it, although the run authorization has already expired.

SUMMARY OF THE INVENTION

In view of the above, it is an object of the invention to provide a method of operating a computer system and a computer system, both of which allow user-friendly termination of the use of the application upon expiration of the run authorization of an application.

According to the invention, this object is achieved by a method of operating a computer system, on which the application is installed, wherein the presence of a predetermined run authorization for the application is verified and, in the absence of said predetermined run authorization, the speed of execution of the application on the computer system is decreased as compared to the speed of execution of the application in the presence of the predetermined run authorization.

This allows the functionality provided by the application to be maintained, thus enabling, for example, saving of the work result by storage. However, reasonable use is no longer possible if the speed of execution is suitably decreased, allowing the provider (or licensor) of the application to prevent unauthorized use of the application.

For example, the run authorization may have expired and may, therefore, not be present (anymore).

The computer system may be a conventional personal computer or may also be a system formed by several computers.

In other words, the method of the invention relates to a method of influencing the execution of an application on a computer system, said method comprising the following steps:

verifying the presence of a predetermined run authorization for the application and, in the absence of said predetermined run authorization, decreasing the speed of execution of the application on the computer system as compared to the speed of execution in the presence of the predetermined run authorization.

For example, a preferred decrease in the speed of execution may be selected such that the decreased speed of execution is less than 50%, in particular 90% or less, of the speed of execution of the application in the presence of the predetermined run authorization. In any case, the decrease in the speed of execution should be selected such that it is practically no longer possible to work reasonably with the application, while simple operations, such as storing data, are still feasible.

In particular, in case the verification step shows the absence of the predetermined run authorization, a displaying step may also be executed, wherein a display is generated which informs the user about the expiration of the run authorization. In addition, said display may indicate that the speed of execution of the application is being decreased. This shows the user why the speed of execution of the application is decreasing. If he wishes to continue use of the application, he may acquire a new run authorization.

Further, the decrease in the speed of execution may be increased in the course of time. Thus, it is advantageously achieved that, initially, user-friendly termination of the application by storage of results is still possible with a reasonable expenditure of time, and subsequently, use of the application may be safely prevented due to the ever-decreasing speed of execution. The increase in said decrease may be constant in time or may increase with time (e.g., exponentially).

In a particularly advantageous embodiment of the method according to the invention, the verification step is executed when accessing the application and/or during execution of the application. The verification step may be carried out several times during execution of the application (e.g., at predetermined time intervals and/or upon occurrence of a predetermined event which occurs during execution of the application, such as access to a certain function or a certain routine of the application). In particular, execution of the verification step during execution of the application may prevent unauthorized use of the application, after expiration of the run authorization, by a user not terminating the application.

In the method according to the invention, a resource provided to the application by the computer system may be made scarce in order to decrease the speed of execution. As used herein, a resource is understood to be any hardware and/or software module of the computer system which is used by the application during its execution. Thus, the decrease in the speed of execution may easily be achieved.

A resource which is made scarce may be, for example the processor time (time slice) allocated to the application (e.g., by the operating system of the computer system). If said processor time is reduced, the speed of execution of the application automatically decreases as well. The processor time may also be reduced by lowering the priority attributed to the application, since, the lower the priority gets, the shorter will be the processing time or the smaller will be the time slice allocated to the application or any other process to be executed. Lowering the priority is easy, since it does not require any change in the application itself.

If the application comprises several execution paths (or threads), the priorities of said execution paths may be changed such that the overall speed of execution of the application decreases.

Further, a resource may be made scarce by being differently allocated. Thus, for example, the working memory of the computer system may be allocated such that less working memory is available to the application. Also, less working memory may be directly allocated to the application straight away. As a result, more data and/or code need to be swapped out, for example, to a hard disk of the computer system, during execution of the application, which decreases the speed of execution.

A resource may also be made scarce by slowing down the possibility of inputting data via an input unit (e.g., keyboard or mouse) of the computer system. Thus, an effect in connection with a mouse may be that, in the case of the expired run authorization, the same displacement of a mouse pointer on the screen of the computer system may require a much greater movement of the mouse as compared with the case of the run authorization being present. Further, the number of mouse clicks or of key strokes being processed further per time unit may also be reduced.

Particularly preferably, the bandwidth at which the application communicates with other software and/or hardware elements of the computer system is reduced. Thus, for example, the bandwidth at which information input via an input unit (e.g., keyboard, mouse) is transmitted to the application, can be reduced. This decreases the speed of execution, since the application has to wait longer for necessary information. Advantageously, the bandwidth reduction requires no intervention in the application itself and is, therefore, easy to realize or automatically realizable (e.g., by means of what is called automatic embedding, which will be described in more detail hereinafter).

Further, in order to decrease the speed of execution, verification of the presence of the predetermined run authorization may be carried out, for example, so many times and/or so slowly that the desired decrease in the speed of execution is achieved. If at least part of the application is encrypted, the required decrypting and, as the case may be, also encrypting of data and/or of code of the application may be effected more slowly in the absence or upon expiration of the predetermined run authorization than in the presence of the predetermined run authorization.

A preferred embodiment of the method according to the invention consists in reducing the computing power of the computer system in order to decrease the speed of execution. Advantageously, this embodiment does not require any change in the application itself. There is merely a reduction in the computing power of the computer system or in its performance. This may be achieved, for example, by reducing the clock frequency of the CPU (central processing unit). Also, a smaller available working memory may be indicated, so that more data and code have to be swapped out, for example, to a hard disk of the computer system, thus achieving a decrease in speed.

Further, additional code may be executed in the method according to the invention in order to decrease the speed of execution. Said code may be code of the application, which is executed only in order to decrease the speed of execution. Thus, for example, a wait loop can be realized using said additional code. It is also possible that a decrease in the speed of execution by a predetermined percentage, as compared with the speed of execution in the presence of the run authorization, may be realized by the additional code in that it determines a corresponding period of time, during which a wait function is executed, on the basis of the time slice(s) allocated to the application and of the predetermined percentage.

In particular, a decrease in the speed of execution may be achieved by the method according to the invention in that the system performance required by the application is increased. This may be achieved, for example in that sections of the application (for example, data and/or code), which have already been loaded into the working memory of the computer system are marked as not present, so that they have to be loaded into the working memory again although they are actually present.

The method according to the invention is preferably further embodied such that, in order to decrease the speed of execution, the execution of the application is temporarily interrupted. Execution can be resumed after the respective interruptions. On the whole, this will lead to the desired decrease in the speed of execution. The temporary interruption of execution is particularly suitable for selective adjustment of the decrease in the speed of execution. If the computer system or its operating system provides a so-called timer function, which transmits one message each at an adjustable time interval of the application, the execution of the application can be interrupted every time such message is transmitted. The duration of said interruption may be defined as a percentage of the time interval so that an extremely precise decrease in the speed of execution is achieved.

Alternatively, said interruption may be executed by means of an interrupt routine such that said interrupt routine sets and effects the next interruption as a function of the previous interruption (e.g., of the starting point of said interruption and of its duration). In this case, it only has to be ensured that the interrupt routine is continually called during execution of the application. Thus, said interruptions are not executed at constant time intervals, but at differing time intervals. Nevertheless, a pre-defined decrease can be selectively adjusted.

In a preferred embodiment of the method according to the invention, in addition to the reduction of the speed of execution, the readability of a (graphical) user interface of the application displayed on an output unit of the computer system is deteriorated. As a result, the ease of use is advantageously diminished without restricting the functionality provided by the application, thus keeping the user from using the application for which there is no longer any run authorization.

In particular, the deterioration of the readability of the displayed user interface is designed such that it increases with time, said increase preferably not being linear. This leads to a further restriction in the usability of the application, so that, as desired, the application is no longer used.

The deterioration of the readability may be effected in the most diverse manners. Thus, for example, the contrast (in brightness and/or in color) of the displayed user interface may be reduced. It is also possible to reduce the brightness of the displayed user interface. Further, the user interface may also be displayed more transparently, so that windows (e.g. in Windows operating systems) behind it, or the image background behind it, shine through. Further, the color design of the user interface may also be changed so as to reduce readability. The reduced readability may affect one or more areas of the user interface, or even the entire user interface.

According to a further embodiment of the method according to the invention, in addition to the reduction of the speed of execution, additional input by the user may be required, without which the application is no longer executed. Such additional input may be, for example, a renewed log-on to the computer system. This additional input may be requested repeatedly, the time intervals between such requests preferably becoming shorter and shorter with time.

The object is also achieved by a method of operating a computer system on which an application is installed, said method comprising the steps of:
 verifying the presence of a run authorization for the
  application and, if said predetermined run authorization is not present (any longer), deteriorating the readability of a user interface of the application displayed on an output unit of the computer system, as compared to the readability of the displayed user interface in the presence of the predetermined run authorization. By the deterioration or reduction of readability, the use of the application is made harder without restricting its functionality. Said reduction may be selected such that, for example, work results can still be saved by storage, but reasonable use is no longer possible.

In particular, the reduction of readability may increase with time, said increase preferably being selected to be non-linear (for example, exponential). This still allows easy saving shortly after expiration of the run authorization, and allows deterioration of the operability or of the usability of the application, as time progresses, such that a reasonable use is no longer possible.

The reduction of readability may preferably be achieved by reducing the contrast (in brightness and/or color) and/or the brightness of the displayed user interface and/or increasing the transparency of the displayed user interface. These are easily realized technical possibilities, so that the method according to the invention is put into practice in an easy and, thus, also inexpensive manner.

The reduction in readability may affect one or more areas of the user interface, or even the entire user interface.

Code required for execution of the described method steps may be integrated completely, or in part, in the application. In particular, it may already be provided when generating the application. Alternatively, it is also possible to integrate the required code into an already existing application by what is called automatic embedding. For this purpose, said code is added to the already existing application such that the additional code is executed prior to execution of the code of the already existing application. The code of the already existing application is virtually encircled by the additional code.

Then, the code added by means of automatic embedding hooks up with the application, in a suitable place, in order to enable the above-described method steps. Thus, for example, it may hook up during system calls of the application (calls by which functions provided by the computer system or its operating system are called). Importantly, said hook-up is effected in a manner allowing safe execution of the described method steps.

The object is also achieved by a computer system comprising an installed application and a means of verification, which verifies whether a predetermined run authorization for the application is present, and, if said predetermined run authorization is not present, causes the speed of execution of the application on the computer system to be lower than the speed of execution of the application in the presence of the predetermined run authorization and/or causes the readability of a user interface of the application displayed on an output unit of the computer system to deteriorate as compared to the readability of the displayed user interface in the presence of the predetermined run authorization.

Thus, it is advantageously achieved that the functionality provided by the application remains intact, but, due to the decrease in the speed of execution and/or the deteriorated readability of the displayed user interface, said functionality is no longer reasonably usable. This allows the application to be terminated in a user-friendly manner (e.g. by saving the work results).

The means of verification may be in the form of software and/or hardware. In particular, it may be embodied such that it causes the above-described embodiments of the method according to the invention.

Thus, the means of verification may cause the decrease in the speed of execution and/or the deterioration in readability, directly or indirectly, by informing an additional component about the absence of said run authorization, said additional component then causing the decrease in the speed of execution and/or the deterioration of readability. The means of verification and the additional component may each be incorporated in the application, completely or in part, or may not be part of the application.

The computer program product according to the invention comprises software code, by which the steps of the method according to the invention and, in particular, of the described embodiments of the method according to the invention, are executed once the product is running on a computer system. In addition to the required hardware (such as, e.g., processor, working memory, non-volatile memory, output unit, input unit), such a computer system also comprises, for example, an operating system. The software code (instructions and, as the case may be, data) of the computer program product according to the invention is adapted to the computer system such that the steps of the method according to the invention are realized during execution of the computer program product and, thus, of the software code.

According to an advantageous embodiment of the computer program product according to the invention, said computer program product is stored on a data storage medium which is readable by the computer system. As data carrier, any medium may be used from which the stored computer program product may be read out again, such as a diskette, a CD, a DVD, a magnetic tape, a hard disk, or other non-volatile storage elements.

BRIEF DESCRIPTION OF THE DRAWINGS

The invention will be explained in more detail below, by way of example and with reference to the drawings, wherein.

DETAILED DESCRIPTION OF THE DRAWINGS

Figure 1:
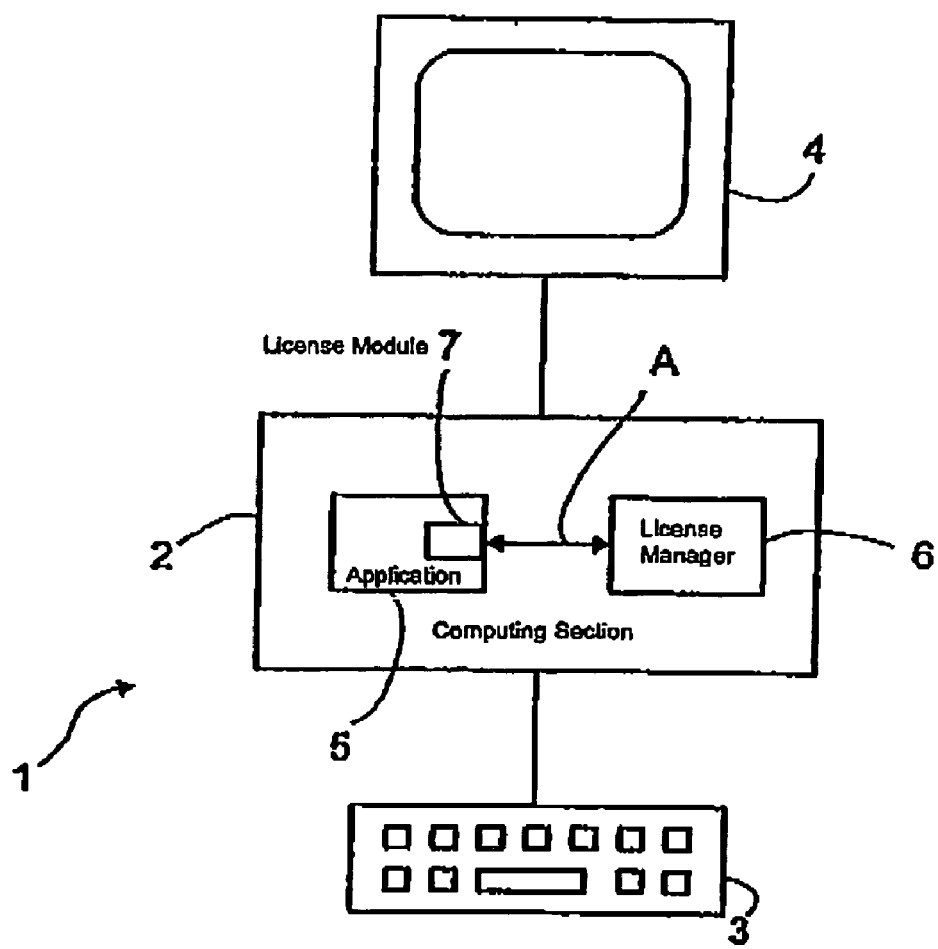
FIG. 1 shows a schematic view of an embodiment of the computer system according to the invention, and FIGS. 2a und 2b show a user interface of the application displayed on an output unit of the computer system of FIG. 1.

FIG. 1 schematically shows an embodiment of the computer system 1 according to the invention, which comprises a computing section 2 (comprising, for example, a processor, a hard disk, further hardware elements as well as an operating system), an input unit 3 (in this case, for example, a keyboard) as well as an output unit 4 (e.g. a screen).

The computer system 1 has an application 5 and a license manager 6 installed thereon. The application 5 comprises a license module 7, which verifies, upon starting the application 5 and/or during execution of the application 5 (for example, at predetermined time intervals), together with the license manager 6 (as indicated by the double arrow A), whether a predetermined run authorization (or license) is present for the application. Said verification of the presence of the run authorization serves to prevent unauthorized use of the application.

If the predetermined run authorization is present, the application 5 can be normally executed. If, however, the predetermined run authorization is not present, for example, because it has expired, the license module 7 and/or the license manager 6 generate/s a display showing that the license has expired and that, therefore, the use of the application will be possible only in a very limited manner. Said display may be output, for example, in a window or in a (graphical) user interface of the application 5, via the display unit 4.

At the same time, the speed of execution of the application 5, as compared to the speed of execution in the presence of the use authorization, is decreased by means of the license module 7 and/or the license manager 6, such that reasonable use of the application is hardly possible anymore.

The license module 7 and the license manager 6 form a means of verification, which verifies the presence of the run authorization and, depending on the result of verification, allows normal execution of the application or causes the application to be executed at a lower speed of execution.

The decrease in the speed of execution may be realized, for example, in that the application 5 is given a lower priority than before, so that less computing time of the computing section 2 is provided to the application 5 due to said lower priority. This slows down the overall speed of execution of the application 5. Thus, the decrease in the speed of execution is achieved by making a resource scarce which is provided to the application 5 by the computer system 1.

The decrease in the speed of execution of the application 5 may also be achieved by reducing the overall computing power of the computer system 1. This may be realized, for example, by reducing the clock frequency of the processor of the computing section 2.

Further, a decrease in the speed of execution is possible by the application 5 comprising program code, which is executed upon expiration of the run authorization and serves to decrease the speed of execution of the application 5. Said program code may be code whose execution leads to said slow-down. Said code may also have the effect that computing time allocated to the application 5 by the computer system 1 is not used. Further, the code may represent an additional execution path (or thread) of the application 5, said additional execution path preferably being given a higher priority than all other execution paths of the application 5. In this additional execution path, in turn, functions may be realized which serve to reduce the overall speed of execution of the application 5.

A decrease in the speed of execution of the application 5 may also be achieved in that the execution of sections of the application 5 requires more computing power of the computer system 1. If the computer system 1 comprises a main memory divided into memory pages wherein respective sections of the application 5 are stored, this may be realized in that memory pages of the main memory, wherein sections of the application 5 are stored, are marked such that they cannot be called. This may be achieved, for example, by marking the respective memory pages as not present or as free, so that the respective section, although already stored, has to be loaded in the main memory again.

The decrease in the speed of execution of the application 5 is preferably increased with time, so that the speed of execution slows down continuously. This may be continued until the application is no longer executable. The increase in said decrease may be constant in time or may increase with time. In this way, the decrease in the speed of execution may be increased, for example, exponentially.

In applications which comprise a (graphical) user interface, said user interface or its display on the screen may additionally be changed such that the readability of the user interface and, thus, also the use of the application, is made harder.

For example, the readability of the user interface may be deteriorated by reducing the contrast (of brightness and/or of color) of the displayed user interface and/or by displaying the user interface in a more transparent manner, so that elements lying behind it shine through. Further, the brightness of the displayed user interface may also be reduced. The deterioration in readability may be effected such that it increases with time.

Figure 2A:
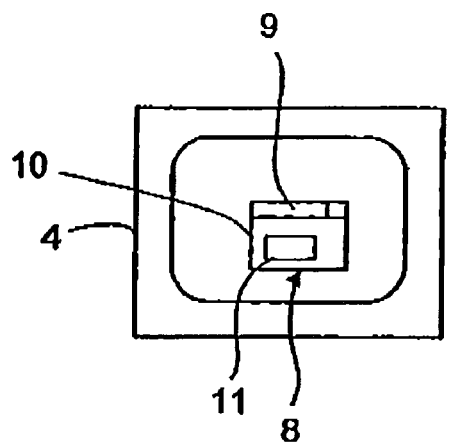

FIG. 2a shows the screen 4 of the computer system of FIG. 1, comprising a user interface 8 of the application 5 displayed on the screen 4. The user interface 8 comprises, as is common in Windows operating systems, a title bar 9 as well as an active area 10 for display and/or input of information. In this case, it is assumed that user inputs have to be made, for example, in the indicated section 11 in order to enable use of the application 5.

Figure 2B:
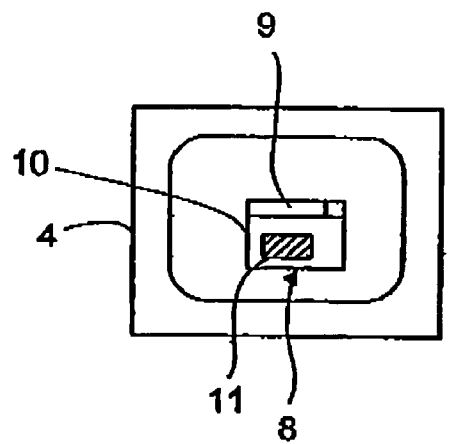

Said section 11 is displayed, for example, less brightly if the predetermined run authorization is not present, as indicated by the shading in FIG. 2b. This makes it more difficult to use the application.

The invention claimed is:

1. A method of operating a computer system on which an application is installed, said method comprising the steps of:
   verifying whether a predetermined run authorization for the application is present, and
   in the absence of said predetermined run authorization, decreasing the speed of execution of the application on the computer system as compared to the speed of execution of the application in the presence of the predetermined run authorization.
   wherein a rate of the decrease in the speed of execution is increased with time.

2. The method as claimed in claim 1, wherein code, in particular code of the application, is executed in order to decrease the speed of execution.

3. A computer program product, comprising software code, by which the steps of the method according to claim 1 are executed once the product is running on a computer system.

4. The method as claimed in claim 1, wherein a resource provided to the application by the computer system is made scarce in order to decrease the speed of execution.

5. The method as claimed in claim 1, wherein the bandwidth at which the application communicates with at least one of a software module and a hardware module of the computer system is reduced in order to decrease the speed of execution.

6. The method as claimed in claim 1, wherein the verification step is repeated in order to decrease the speed of execution.

7. The method as claimed in claim 1, wherein the verification step is repeated and executed more slowly in order to decrease the speed of execution.

8. The method as claimed in claim 1, wherein the computing power of the computer system is reduced in order to decrease the speed of execution.

9. The method as claimed in claim 1, wherein the system performance required by the application during execution is increased in order to decrease the speed of execution.

10. The method as claimed in claim 1, wherein execution of the application is temporarily interrupted in order to decrease the speed of execution.

11. The method as claimed in claim 1, wherein a user interface of the application is displayed on an output unit of the computer system and, in addition to the decrease in the speed of execution, the readability of the user interface is deteriorated.

12. The method as claimed in claim 11, wherein said deterioration in readability is increased with time.

13. A computer system comprising:
an installed application, and
a means of verification which verifies whether a predetermined run authorization for the application is present, and, if said predetermined run authorization is not present, causes the speed of execution of the application on the computer system to be lower than the speed of execution of the application in the presence of the predetermined run authorization
wherein a rate of a decrease in the lower speed of execution is increased with time.

14. The computer system as claimed in claim 13, wherein the means of verification, if said predetermined run authorization is not present, additionally causes the readability of a user interface of the application displayed on an output unit of the computer system to deteriorate as compared to the readability of the displayed user interface in the presence of the predetermined run authorization.

15. A method of operating a computer system on which an application is installed, said method comprising the steps of:
displaying a user interface of the application on an output unit of the computer system,
verifying whether a predetermined run authorization for the application is present, and,
in the absence of said predetermined run authorization, deteriorating the readability of said displayed user interface as compared to the user interface displayed in the presence of the predetermined run authorization,
wherein a rate deterioration of the readability of said displayed user interface is increased with time.

16. The method as claimed in claim 15, wherein at least one of the contrast of the displayed user interface and the brightness of the displayed user interface is decreased in order to reduce readability.

17. The method as claimed in claim 16, wherein the transparency of the displayed user interface is increased in order to reduce readability.

18. The method as claimed in claim 15, wherein the transparency of the displayed user interface is increased in order to reduce readability.

19. A computer system comprising an installed application and a means of verification, which verifies whether a predetermined run authorization for the application is present, and, if said predetermined run authorization is not present, causes the readability of a user interface of the application displayed on an output unit of the computer system to deteriorate as compared to the readability of the displayed user interface in the presence of the predetermined run authorization, wherein a rate of deterioration of the readability of the user interface is increased with time.

* * * * *